(12) United States Patent
Sasaki et al.

(10) Patent No.: US 9,631,682 B2
(45) Date of Patent: Apr. 25, 2017

(54) SYNCHRONIZATION DEVICE FOR MANUAL TRANSMISSION OF VEHICLE

(71) Applicants: Yuu Sasaki, Kariya (JP); Masaya Ichikawa, Anjyo (JP); Tsuyoshi Kanesa, Aichi-ken (JP); Yasuhiro Nitta, Nagoya (JP)

(72) Inventors: Yuu Sasaki, Kariya (JP); Masaya Ichikawa, Anjyo (JP); Tsuyoshi Kanesa, Aichi-ken (JP); Yasuhiro Nitta, Nagoya (JP)

(73) Assignee: Aisin AI CO., LTD., Nishio-Shi, Aichi-Ken (JP)

( * ) Notice: Subject to any disclaimer, the term of this patent is extended or adjusted under 35 U.S.C. 154(b) by 146 days.

(21) Appl. No.: 14/436,733

(22) PCT Filed: Oct. 18, 2013

(86) PCT No.: PCT/JP2013/078345
§ 371 (c)(1),
(2) Date: Apr. 17, 2015

(87) PCT Pub. No.: WO2014/061792
PCT Pub. Date: Apr. 24, 2014

(65) Prior Publication Data
US 2016/0138661 A1    May 19, 2016

(30) Foreign Application Priority Data

Oct. 19, 2012    (JP) .................................. 2012-231474

(51) Int. Cl.
*F16D 11/10*    (2006.01)
*F16D 23/02*    (2006.01)
(Continued)

(52) U.S. Cl.
CPC ........... *F16D 23/025* (2013.01); *F16D 23/06* (2013.01); *F16H 55/17* (2013.01); *F16H 63/30* (2013.01);
(Continued)

(58) Field of Classification Search
CPC ............. F16H 61/0403; F16H 2306/48; F16D 23/025; F16D 23/06; F16D 23/08
(Continued)

(56) References Cited

U.S. PATENT DOCUMENTS 4,660,707 A * 4/1987 Sadanori ................. F16D 23/06
                                                        192/53.34
4,828,087 A    5/1989 Kudo et al.
(Continued)

FOREIGN PATENT DOCUMENTS

JP    59-17369 U    2/1984
JP    2009243611 A    10/2009
(Continued)

OTHER PUBLICATIONS

International Search Report (PCT/ISA/210) mailed on Jan. 21, 2014, by the Japanese Patent Office as the International Searching Authority for International Application No. PCT/JP2013/078345.
(Continued)

*Primary Examiner* — Ha D Ho
(74) *Attorney, Agent, or Firm* — Buchanan Ingersoll & Rooney PC

(57) ABSTRACT

A synchronization device for a manual transmission of a vehicle, including a synchronizer ring configured to synchronize rotation of a transmission gear and clutch hub. The synchronizer ring includes: a ring body having an annular shape; an axial protruding portion protruding from the ring body toward the clutch hub in an axial direction to set a size of an axial clearance between the ring body and the clutch
(Continued)

hub; and a radial protruding portion protruding from the ring body toward the clutch hub in a radial direction intersecting the axial direction to set a size of a radial clearance to be formed between the ring body and the clutch hub. The ring body, the axial protruding portion, and the radial protruding portion are formed integrally by metal stamping.

4 Claims, 4 Drawing Sheets

(51) Int. Cl.
     *F16D 23/06*      (2006.01)
     *F16H 55/17*      (2006.01)
     *F16H 63/30*      (2006.01)

(52) U.S. Cl.
     CPC ............... *F16D 2023/0656* (2013.01); *F16D 2250/0023* (2013.01); *F16H 2055/178* (2013.01); *F16H 2063/3093* (2013.01)

(58) Field of Classification Search
     USPC .......................................... 74/339; 192/53.34
     See application file for complete search history.

(56) References Cited

U.S. PATENT DOCUMENTS

| 5,620,075 | A | * | 4/1997 | Larsen | ................... F16D 23/06 192/53.34 |
| 5,626,214 | A | * | 5/1997 | Schlaich | ............... F16D 23/025 192/53.34 |
| 8,567,275 | B2 | * | 10/2013 | Appelshaeuser | ..... F16D 23/025 192/53.36 |
| 2012/0292152 | A1 | | 11/2012 | Park | |

FOREIGN PATENT DOCUMENTS

| JP | 2010-236569 A | 10/2010 |
| JP | 2012-241899 A | 12/2012 |

OTHER PUBLICATIONS

Written Opinion (PCT/ISA/237) mailed on Jan. 21, 2014, by the Japanese Patent Office as the International Searching Authority for International Application No. PCT/JP2013/078345.

* cited by examiner

SYNCHRONIZATION DEVICE FOR MANUAL TRANSMISSION OF VEHICLE

TECHNICAL FIELD

The present invention relates to a synchronization device for a manual transmission of a vehicle, which is to be mounted on a vehicle.

BACKGROUND ART

In JP 2010-236569 A, there is disclosed an example of the synchronization device for a manual transmission of a vehicle. This synchronization device includes a gear rotatable relative to a rotation shaft, a clutch hub rotatable integrally with the rotation shaft, a gear piece movable relative to the gear, and a synchronizer ring configured to couple a sleeve and the gear piece when the sleeve is moved in an axial direction. The synchronizer ring functions to synchronize the rotation of the gear and the rotation of the sleeve, to thereby couple the gear and the clutch hub so as to be rotatable integrally with each other.

SUMMARY OF INVENTION

Incidentally, in the synchronization device as disclosed in JP 2010-236569 A, hitherto, the synchronizer ring has generally been manufactured by forging and machining. However, this type of manufacturing method may hinder reduction of cost required for the synchronizer ring. In view of this, the synchronizer ring is manufactured by metal stamping, thereby being capable of reducing the cost. In this case, to apply the metal stamping for the manufacture of the synchronizer ring, there is a demand for the structure of preventing enlargement of a clearance in the axial direction (thrust clearance) and a gap in a radial direction (radial clearance), which are formed between the clutch hub and the synchronizer ring opposed to each other, for the purpose of avoiding impairment of the original function of the synchronizer ring due to increase of inclination of the synchronizer ring with respect to the clutch hub.

The present invention has therefore been made in view of the above-mentioned points, and has an object to provide an effective technology for reducing cost required to manufacture a synchronizer ring of a synchronization device for a manual transmission of a vehicle, which is to be mounted on a vehicle, while securing appropriate clearances between the synchronizer ring and a clutch hub opposed to each other.

In order to achieve the above-mentioned object, a synchronization device for a manual transmission of a vehicle according to one embodiment of the present invention includes a clutch hub, a hub sleeve, a gear piece, and a synchronizer ring.

The clutch hub is constructed as an annular member arranged, in an integrally rotatable manner, on a rotation shaft forming a powertrain between the rotation shaft and a drive wheel of the vehicle. In this case, rotational torque of the rotation shaft is transmitted to the drive wheel of the vehicle so that the drive wheel is driven. The hub sleeve is constructed as a member including internal splines engaged with external splines formed on an outer circumference of the clutch hub, and being movable from a first position to a second position in an axial direction of the rotation shaft under a state in which the internal splines are engaged with the external splines of the clutch hub. The gear piece is formed on a transmission gear arranged on the rotation shaft in a relatively rotatable manner, and includes external splines to be brought into an unengaged state, in which the external splines are not engaged with the internal splines of the hub sleeve at the first position thereof, and into an engaged state, in which the external splines are engaged with the internal splines of the hub sleeve at the second position thereof.

The synchronizer ring is arranged between the clutch hub and the gear piece, and functions to synchronize rotation of the transmission gear and rotation of the clutch hub by coupling the hub sleeve and the gear piece when the hub sleeve is moved from the first position to the second position in the axial direction. In particular, an annular ring body, an axial protruding portion, and a radial protruding portion as components of the synchronizer ring are formed integrally by metal stamping. In this case, the axial protruding portion is formed as a portion protruding from the ring body toward the clutch hub in the axial direction so as to set a size of an axial clearance (thrust clearance) to be formed between the ring body and the clutch hub in the axial direction. Further, the radial protruding portion is formed as a portion protruding from the ring body toward the clutch hub in a radial direction intersecting the axial direction so as to set a size of a radial clearance (diametrical direction gap) to be formed between the ring body and the clutch hub in the radial direction.

According to the synchronization device for a manual transmission of a vehicle, which has the structure described above, on the one hand, due to the axial protruding portion and the radial protruding portion of the synchronizer ring, appropriate clearances (axial clearance and radial clearance) can be secured between the synchronizer ring and the clutch hub opposed to each other. On the other hand, the components of the synchronizer ring are formed integrally by metal stamping, and thus the cost required to manufacture the synchronizer ring can be reduced as compared to, for example, the case where forging and machining are employed. Further, there is no need to change the peripheral structure or add a component so as to eliminate the clearances between the synchronizer ring and the clutch hub. As a result, the cost reduction can also be achieved by suppressing increase of the number of components.

According to another embodiment of the present invention, in the synchronization device for a manual transmission of a vehicle, it is preferred that the ring body of the synchronizer ring include: a cylindrical portion extending in a cylindrical shape along the axial direction; and a flange portion being connected to the cylindrical portion and extending along the radial direction, that the radial protruding portion protrude from the cylindrical portion toward the clutch hub, and that the axial protruding portion protrude from the flange portion toward the clutch hub. Further, it is preferred that all of the cylindrical portion, the flange portion, the radial protruding portion, and the axial protruding portion be equal to each other in thickness. Thus, simple metal stamping such as punching and bending of a plate-like metal material can be applied so as to obtain the synchronizer ring.

According to another embodiment of the present invention, in the synchronization device for a manual transmission of a vehicle, it is preferred that the axial protruding portion of the synchronizer ring include a plurality of axial protruding portions formed at regular intervals in a circumferential direction of the ring body, and that the radial protruding portion of the synchronizer ring include a plurality of radial protruding portions formed at regular intervals in the circumferential direction of the ring body. Thus, the axial protruding portions and the radial protruding portions are arranged with good balance in the circumferential direction of the ring body. As a result, the increase of the inclination of the synchronizer ring with respect to the clutch hub can be prevented with good balance over the entire circumferential direction.

As described above, according to the embodiments of the present invention, it is possible to reduce the cost required to manufacture the synchronizer ring of the synchronization device for a manual transmission of a vehicle while securing appropriate clearances between the synchronizer ring and the clutch hub opposed to each other.

DESCRIPTION OF EMBODIMENTS

Now, a synchronization device for a manual transmission according to embodiments of the present invention is described with reference to the drawings.

Figure 1:
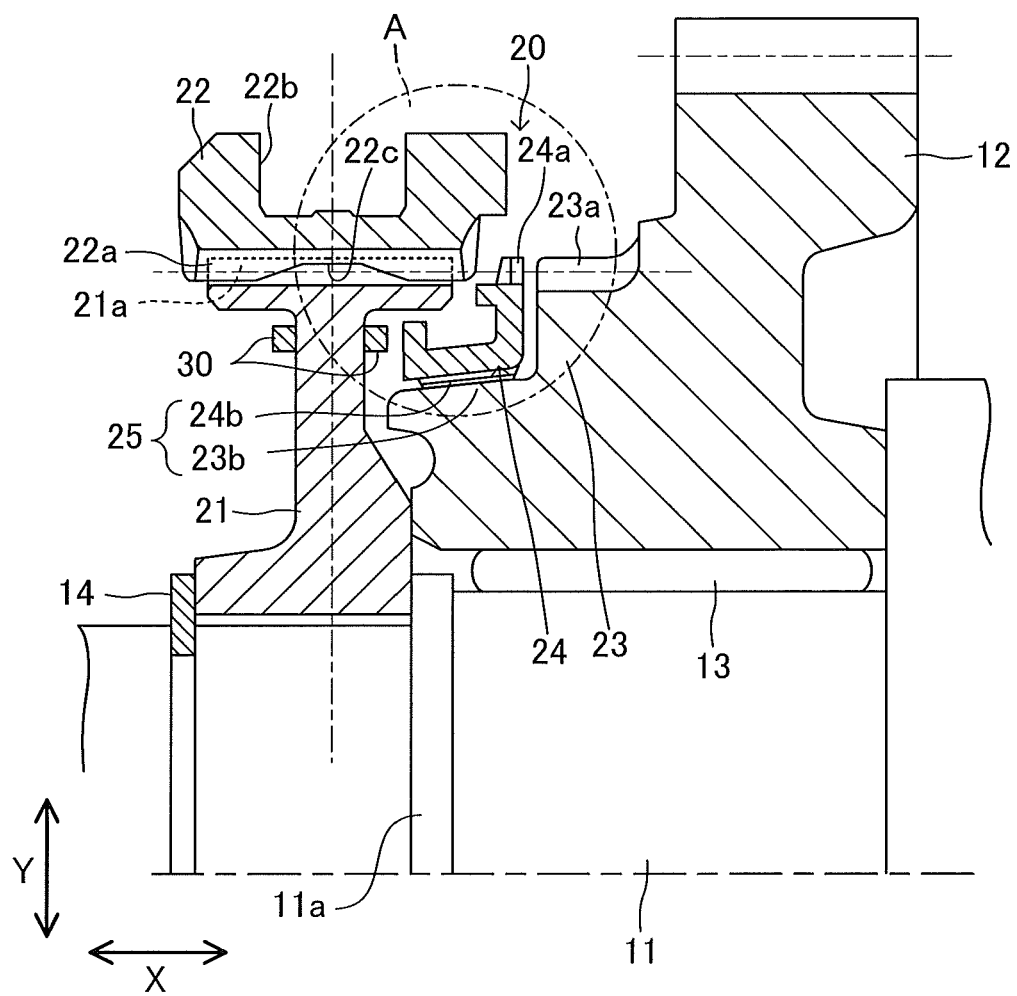
FIG. 1 is a sectional view illustrating a main part of a synchronization device 20 for a manual transmission of a vehicle according to one embodiment of the present invention.

FIG. 1 illustrates a part of the manual transmission of a vehicle, which is to be mounted on a vehicle. The manual transmission of a vehicle is mounted on a powertrain connecting a drive output shaft of an engine serving as a drive source of the vehicle and a drive wheel of the vehicle. In the manual transmission of a vehicle, a transmission gear (also referred to as "transmission gearing") 12 is assembled, through intermediation of a bearing 13, to a rotation shaft (also referred to as "transmission shaft") 11 forming the powertrain between the rotation shaft 11 and the drive wheel of the vehicle. The rotation shaft 11 is supported on a casing (not shown) through intermediation of bearings (not shown) in a relatively rotatable manner. The transmission gear 12 is formed into an annular shape about the rotation shaft 11, and is supported so as to be rotatable relative to the rotation shaft 11 under a state in which movement of the transmission gear 12 in an axial direction X of the rotation shaft 11 is prevented. Further, a synchronization device 20 is arranged in a region adjacent to the transmission gear 12 (region on the left of the transmission gear 12 in FIG. 1).

The synchronization device 20 includes a clutch hub 21, a hub sleeve 22, a gear piece 23, and a synchronizer ring 24. Those components are each made of a metal material. The synchronization device 20 corresponds to a "synchronization device for a manual transmission of a vehicle" according to the present invention.

The clutch hub 21 is formed into an annular shape about the rotation shaft 11, and is arranged in a region on the rotation shaft 11, which is connected to the transmission gear 12 along the axial direction X of the rotation shaft 11 (region on the left of the transmission gear 12 in FIG. 1). The clutch hub 21 is sandwiched from both sides between an annular flange portion 11a, which extends from the rotation shaft 11 in a radial direction Y intersecting the axial direction X, and a snap ring 14, which is assembled to the rotation shaft 11, thereby preventing movement of the clutch hub 21 in the axial direction X. Further, the clutch hub 21 is constructed coaxially with the transmission gear 12, and is spline-coupled to the rotation shaft 11 so as to be rotatable integrally with the rotation shaft 11 in a direction about the axis. The clutch hub 21 has a plurality of external splines 21a formed on an outer circumference thereof. The clutch hub 21 corresponds to a "clutch hub" according to the present invention.

The hub sleeve 22 is formed into an annular shape on the outer circumference of the clutch hub 21, and is assembled to the outer circumference of the clutch hub 21. The hub sleeve 22 has a plurality of internal splines 22a formed on an inner circumference thereof. The internal splines 22a are engaged (meshed) with the plurality of external splines 21a of the clutch hub 21 so that the hub sleeve 22 is movable relative to the clutch hub 21 in the axial direction X of the rotation shaft 11. Further, a circumferential groove 22b extending along a circumferential direction of the hub sleeve 22 is formed in an outer circumference of the hub sleeve 22. A shift fork (not shown) is engaged with the circumferential groove 22b so as to drive the hub sleeve 22 in the axial direction X. The hub sleeve 22 corresponds to a "hub sleeve" according to the present invention.

The gear piece 23 is formed integrally in a region on the transmission gear 12, which is opposed to the clutch hub 21 (region on the left of the transmission gear 12 in FIG. 1), and has a plurality of external splines 23a formed on an outer circumference of the gear piece 23 so as to be engageable (meshable) with the plurality of internal splines 22a of the hub sleeve 22. The plurality of external splines 23a are brought into an unengaged state, in which the plurality of external splines 23a are not engaged with the plurality of internal splines 22a at a first position of the hub sleeve 22, and into an engaged state, in which the plurality of external splines 23a are engaged with the plurality of internal splines 22a at a second position of the hub sleeve 22. The gear piece 23 corresponds to a "gear piece" according to the present invention.

The synchronizer ring 24 is formed into an annular shape about the gear piece 23, and is arranged between the clutch hub 21 and the gear piece 23 in the axial direction X. The synchronizer ring 24 functions to synchronize the rotation of the transmission gear 12 and the rotation of the hub sleeve 22. For this purpose, when the hub sleeve 22 is shifted (moved) by the shift fork (not shown) in the axial direction X from the first position (neutral position) illustrated in FIG. 1 to the second position (shift position) illustrated in FIG. 2, the synchronizer ring 24 generates a frictional engagement force in a region between the transmission gear 12 (gear piece 23) and the hub sleeve 22 (specifically, an engagement portion 25 between the gear piece 23 and the synchronizer ring 24), to thereby couple the transmission gear 12 and the hub sleeve 22 so as to be rotatable integrally with each other. In this case, the engagement portion 25 includes a conical shaft portion 23b including the conical surface formed on the outer wall surface of the gear piece 23, and a conical hole portion 24b including the conical surface formed on the inner wall surface of the synchronizer ring 24. The shaft portion 23b and the hole portion 24b are engaged with each other. Further, the synchronizer ring 24 has a plurality of external splines 24a formed on an outer circumference thereof, so as to be engageable (meshable) with the plurality of internal splines 22a of the hub sleeve 22. The synchronizer ring 24 corresponds to a "synchronizer ring" according to the present invention.

Further, the synchronization device 20 includes well-known shifting keys (not shown). The shifting keys are arranged at three positions on an outer circumferential portion of the clutch hub 21 in the circumferential direction so as to be slidable in the axial direction X. Under a state in which no external force is applied, the shifting keys are elastically biased in a radially outward direction by a pair of springs 30 serving as spring elements so that top portions of the shifting keys are received in recessed portions 22c formed in an inner circumferential portion of the hub sleeve 22.

In the synchronization device 20, when the hub sleeve 22 is located at the first position (neutral position) in FIG. 1, the internal splines 22a of the hub sleeve 22 are engaged (meshed) only with the external splines 21a of the clutch hub 21. Under a state in which the hub sleeve 22 is shifted rightward in the axial direction X in FIG. 1 and therefore set at the second position (shift position), on the other hand, as illustrated in FIG. 2, the internal splines 22a of the hub sleeve 22 are engaged (meshed) with three different portions at the same time, that is, the external splines 21a of the clutch hub 21, the external splines 24a of the synchronizer ring 24, and the external splines 23a of the gear piece 23.

Figure 2:
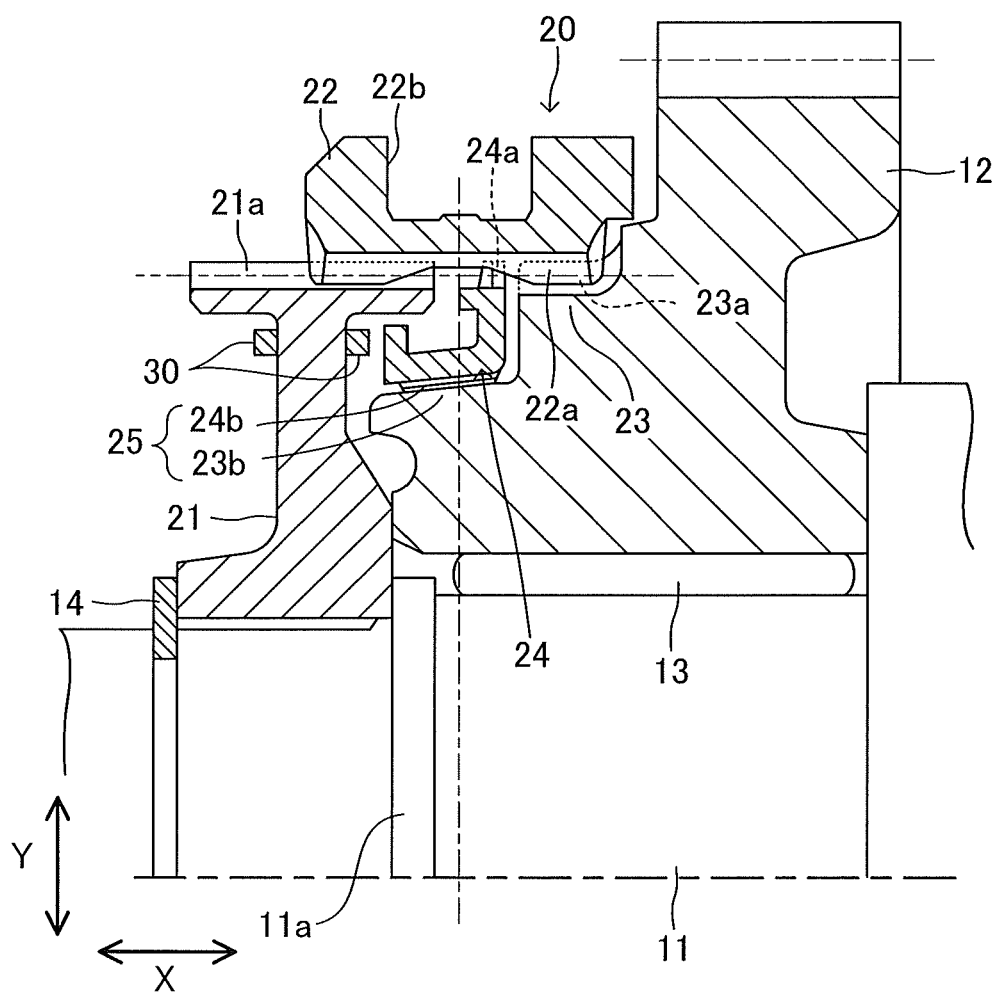
FIG. 2 is a sectional view illustrating the main part of the synchronization device 20 illustrated in FIG. 1 at the time of actuation thereof (shift complete state).

Further, in the synchronization device 20, when the hub sleeve 22 is moved from the first position (neutral position) illustrated in FIG. 1 to the second position (shift position) illustrated in FIG. 2, at an initial stage of the movement, the shifting keys (not shown) are pressed by the hub sleeve 22 in the axial direction and in a radially inward direction against the elastic biasing force of the springs 30 so as to be engaged with the synchronizer ring 24. Accordingly, a chamfered surface of the hub sleeve presses a chamfered surface of the synchronizer ring so that the synchronizer ring 24 is pressed toward the gear piece 23 in the axial direction X. Thus, due to the engagement portion 25 (shaft portion 23b and hole portion 24b) between the gear piece 23 and the synchronizer ring 24, a frictional engagement force is generated in a region between the gear piece 23 and the synchronizer ring 24. As a result, the rotation of the transmission gear 12 and the rotation of the hub sleeve 22 are synchronized so that the transmission gear 12 and the hub sleeve 22 are rotated integrally with each other. In this case, a single-cone synchronizer is employed as the synchronizer ring 24.

Incidentally, in the synchronization device 20 having the structure described above, the synchronizer ring 24 is manufactured by metal stamping, thereby being advantageous in achieving cost reduction as compared to a case where the synchronizer ring is manufactured by forging and machining. The metal stamping herein generally refers to a process that involves fixing male and female dies on a press machine, and squeezing a material generally having a plate-like shape between the dies with a strong force, to thereby deform the metal material. Typical examples of the metal stamping include bending, shearing, punching, cutting, drawing, flanging, compression molding, and joining.

To apply the metal stamping for the manufacture of the synchronizer ring 24, there is a demand for the structure of preventing enlargement of clearances formed between the synchronizer ring 24 and the clutch hub 21 opposed to each other, for the purpose of preventing the inhibition of the original function of the synchronizer ring due to increase of inclination of the synchronizer ring 24 with respect to the clutch hub 21. Specifically, as illustrated in FIG. 3, there is a demand for the structure of preventing enlargement of a clearance in the axial direction X (thrust clearance (axial clearance) $C_S$ in FIG. 3) and a clearance in the radial direction Y (radial clearance (diametrical direction gap) $C_R$ in FIG. 3), which are formed between the clutch hub 21 and the synchronizer ring 24 opposed to each other.

Figure 3:
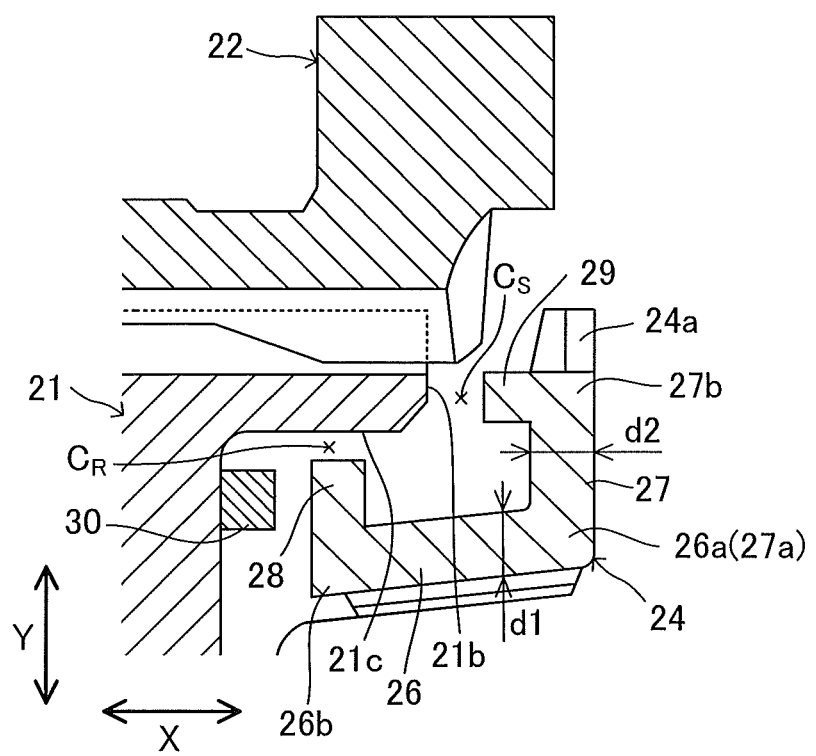
FIG. 3 is an enlarged view illustrating the region A of the synchronization device 20 in FIG. 1.
Figure 4:
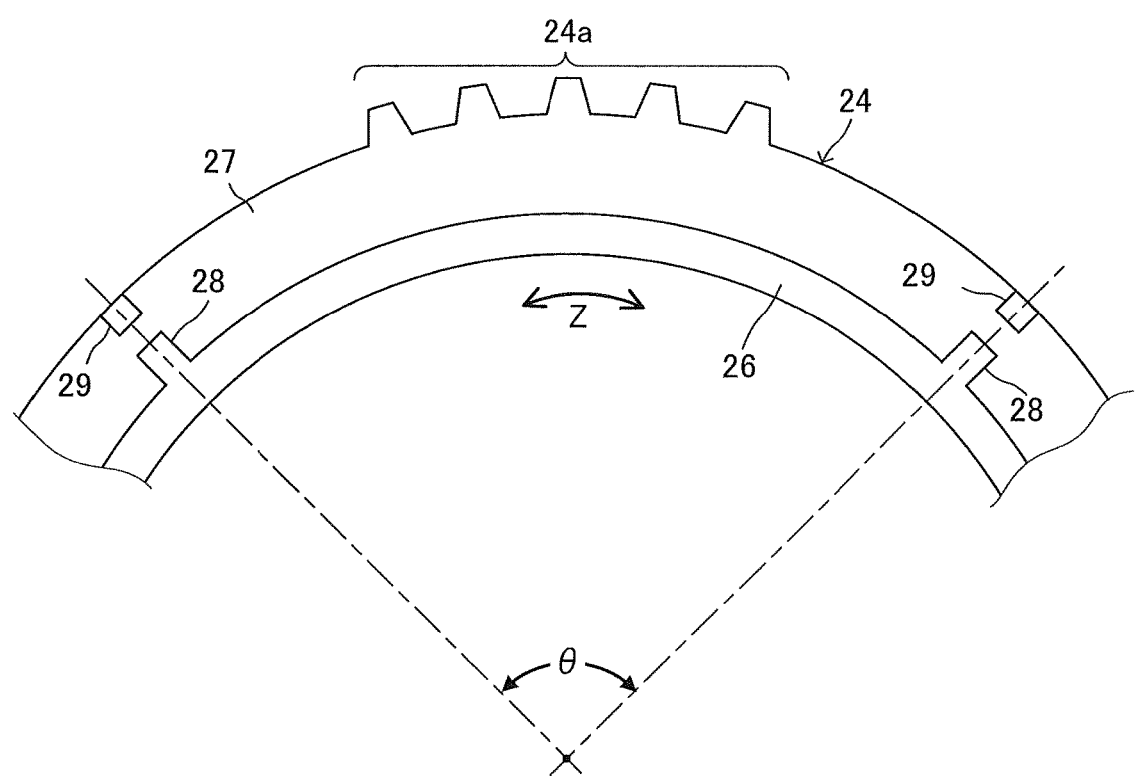
FIG. 4 is a plan view illustrating a part of a synchronizer ring 24 in FIG. 3.

Therefore, the synchronizer ring 24 of this embodiment has a feature in the structure as illustrated in FIGS. 3 and 4. The synchronizer ring 24 includes a cylindrical portion 26 and a flange portion 27 forming an annular ring body, and protruding portions 28 and 29. Those components are formed integrally by metal stamping.

As illustrated in FIG. 3, the cylindrical portion 26 is formed as a portion having a cylindrical shape with a predetermined thickness d1 and extending along the axial direction X in a region between an end portion 26a located away from the clutch hub 21 in the axial direction X and an end portion 26b located close to the clutch hub 21. The flange portion 27 is formed as a portion having a flanged shape with a predetermined thickness d2 and extending along the radial direction Y intersecting the axial direction X in a region between an end portion 27a connected to the end portion 26a of the cylindrical portion 26 and an end portion 27b located away from the cylindrical portion 26. In this case, the thickness d1 of the cylindrical portion 26 and the thickness d2 of the flange portion 27 may be equal to or different from each other. In particular, when the thickness d1 of the cylindrical portion 26 and the thickness d2 of the flange portion 27 are set equal to each other, the cylindrical portion 26 and the flange portion 27 can be formed by simple metal stamping such as bending.

Each protruding portion 28 protrudes in the radial direction Y from the cylindrical portion 26 forming the ring body toward a radially opposing portion 21c on an inner circumferential side of the clutch hub 21 (lower side in FIG. 3). The protruding portion 28 corresponds to a "radial protruding portion" according to the present invention. The protruding portion 28 functions as a clearance setting portion configured to set a desired size for the radial clearance $C_R$ to be formed in a region in which the radially opposing portion 21c of the clutch hub 21 and the cylindrical portion 26 are opposed to each other. In this case, the thickness of the protruding portion 28 in the axial direction X may be equal to or different from the thickness d1 of the cylindrical portion 26. In particular, when the thickness of the protruding portion 28 is set equal to the thickness d1 of the cylindrical portion 26, the protruding portion 28 can be formed by subjecting the cylindrical portion 26 to simple metal stamping such as bending.

Each protruding portion 29 protrudes in the axial direction X from the flange portion 27 forming the ring body toward an axially opposing portion 21b on a lateral surface side of the clutch hub 21 (right side in FIG. 3). The protruding portion 29 corresponds to an "axial protruding portion" according to the present invention. The protruding portion 29 functions as a clearance setting portion configured to set a desired size for the thrust clearance $C_S$ to be formed in a region in which the axially opposing portion 21b of the clutch hub 21 and the flange portion 27 are opposed to each other. In this case, the thickness of the protruding portion 29 in the radial direction Y may be equal to or different from the thickness d2 of the flange portion 27. In particular, when the thickness of the protruding portion 29 is set equal to the thickness d2 of the flange portion 27, the protruding portion 28 can be formed by subjecting the flange portion 27 to simple metal stamping such as bending.

As illustrated in FIG. 4, it is preferred that each couple of the protruding portions 28 and 29 be formed at positions on the synchronizer ring 24, which are aligned in a circumferential direction Z, and that a plurality of the protruding portions 28 and a plurality of the protruding portions 29 be formed at regular intervals, respectively. FIG. 4 illustrates such an embodiment that an angle θ formed between the two adjacent protruding portions 28 and an angle θ formed between the two adjacent protruding portions 29 are both 90° and four couples of the protruding portions 28 and 29 are formed. On the other hand, the angle θ and the number of couples of the protruding portions 28 and 29 are not limited thereto, and may be changed as appropriate depending on the specifications of the synchronizer ring 24 and the like.

The synchronizer ring 24 having the structure described above can be manufactured by metal stamping through, for example, the following steps. First, a plate-like metal material is formed into an annular flat plate by punching. In this case, the plurality of external splines 24a of the synchronizer ring 24 are formed at the same time. After that, the annular flat plate is formed into a member including the cylindrical portion 26 and the flange portion 27 by drawing. After that, the cylindrical portion 26 of this member is bent at the end portion 26b, and the flange portion 27 of this member is bent at the end portion 27b. As a result, the synchronizer ring 24 having the shape illustrated in FIGS. 3 and 4 can be obtained. On the other hand, the synchronizer ring 24 having the shape illustrated in FIGS. 3 and 4 may be manufactured by combining other processes belonging to the metal stamping in various ways.

According to the above-mentioned embodiment, on the one hand, due to the protruding portions 29 of the synchronizer ring 24 in the axial direction X and the protruding portions 28 of the synchronizer ring 24 in the radial direction Y, appropriate clearances (thrust clearance $C_S$ and radial clearance $C_R$) can be secured between the synchronizer ring 24 and the clutch hub 21 opposed to each other. In this case, the appropriate clearances are each defined as a clearance capable of preventing the increase of inclination of the synchronizer ring 24 with respect to the clutch hub 21 over a predetermined level. On the other hand, the cylindrical portion 26, the flange portion 27, and the protruding portions 28 and 29 as the components of the synchronizer ring 24 are formed integrally by metal stamping, and thus the cost required to manufacture the synchronizer ring 24 can be reduced as compared to, for example, the case where forging and machining are employed. Further, there is no need to change the peripheral structure or add a component so as to eliminate the clearances between the synchronizer ring 24 and the clutch hub 21. As a result, the cost reduction can also be achieved by suppressing increase of the number of components.

Further, in the synchronizer ring 24 of the above-mentioned embodiment, it is preferred that all of the cylindrical portion 26, the flange portion 27, and the protruding portions 28 and 29 be equal to each other in thickness. Thus, simple metal stamping such as punching and bending of a plate-like metal material can be applied so as to obtain the synchronizer ring 24.

Further, according to the synchronizer ring 24 of the above-mentioned embodiment, it is preferred that a plurality of the protruding portions 28 be formed at regular intervals in the circumferential direction Z of the cylindrical portion 26, and that a plurality of the protruding portions 29 be formed at regular intervals in the circumferential direction Z of the flange portion 27. Thus, the protruding portions 28 and 29 can be arranged with good balance, respectively. As a result, the increase of the inclination of the synchronizer ring 24 with respect to the clutch hub 21 can be prevented with good balance over the entire circumferential direction.

The present invention is not limited only to the above-mentioned typical embodiment, and various applications and modifications may be conceived. For example, the following respective embodiments applying the above-mentioned embodiment may be carried out.

In the synchronizer ring 24 of the above-mentioned embodiment, the thickness of each portion may be selected as necessary. For example, at least two of the cylindrical portion 26, the flange portion 27, and the protruding portions 28 and 29 as the components of the synchronizer ring 24 may be equal to each other in thickness, or all the components may be different from each other in thickness.

In the synchronizer ring 24 of the above-mentioned embodiment, a plurality of the protruding portions 28 may be formed at arbitrary intervals in the circumferential direction Z of the cylindrical portion 26, and a plurality of the protruding portions 29 may be formed at arbitrary intervals in the circumferential direction Z of the flange portion 27.

Further, the above-mentioned embodiment is directed to the case where the single-cone synchronizer is employed as the synchronizer ring 24. In the present invention, a plurality of multi-cone synchronizers (for example, triple-cone synchronizers or double-cone synchronizers) may be employed instead.

In the present invention, the following aspect can be employed based on the descriptions in the above-mentioned embodiments and various modified examples thereof.

"A synchronization device for a manual transmission of a vehicle, including:

a clutch hub having an annular shape, the clutch hub being arranged, in an integrally rotatable manner, on a rotation shaft forming a powertrain between the rotation shaft and a drive wheel of the vehicle;

a hub sleeve having an annular shape, the hub sleeve including internal splines engaged with external splines formed on an outer circumference of the clutch hub, the hub sleeve being movable from a first position to a second position in an axial direction of the rotation shaft under a state in which the internal splines are engaged with the external splines of the clutch hub;

a gear piece formed on a transmission gear arranged on the rotation shaft in a relatively rotatable manner, the gear piece including external splines to be brought into an unengaged state, in which the external splines are not engaged with the internal splines of the hub sleeve at the first position thereof, and into an engaged state, in which the external splines are engaged with the internal splines of the hub sleeve at the second position thereof; and a synchronizer ring arranged between the clutch hub and the gear piece, the synchronizer ring being configured to synchronize rotation of the transmission gear and rotation of the clutch hub by coupling the hub sleeve and the gear piece when the hub sleeve is moved from the first position to the second position in the axial direction, the synchronizer ring including:

a ring body having an annular shape;

an axial protruding portion, which protrudes from the ring body toward the clutch hub in the axial direction so as to set a size of an axial clearance to be formed between the ring body and the clutch hub in the axial direction; and a radial protruding portion, which protrudes from the ring body toward the clutch hub in a radial direction intersecting the axial direction so as to set a size of a radial clearance to be formed between the ring body and the clutch hub in the radial direction, all of the ring body, the axial protruding portion, and the radial protruding portion being equal to each other in thickness."

Thus, it is possible to provide the synchronization device for a manual transmission of a vehicle, in which the synchronizer ring can simply be manufactured particularly by metal stamping. In this case, it is preferred that the metal stamping be employed, but other processing methods may be employed as necessary.

The invention claimed is:

1. A synchronization device for a manual transmission of a vehicle, comprising:
   a clutch hub having an annular shape, the clutch hub being arranged, in an integrally rotatable manner, on a rotation shaft forming a powertrain between the rotation shaft and a drive wheel of the vehicle;
   a hub sleeve having an annular shape, the hub sleeve comprising internal splines engaged with external splines formed on an outer circumference of the clutch hub, the hub sleeve being movable from a first position to a second position in an axial direction of the rotation shaft under a state in which the internal splines are engaged with the external splines of the clutch hub;
   a gear piece formed on a transmission gear arranged on the rotation shaft in a relatively rotatable manner, the gear piece comprising external splines to be brought into an unengaged state, in which the external splines are not engaged with the internal splines of the hub sleeve at the first position thereof, and into an engaged state, in which the external splines are engaged with the internal splines of the hub sleeve at the second position thereof; and
   a synchronizer ring arranged between the clutch hub and the gear piece, the synchronizer ring being configured to synchronize rotation of the transmission gear and rotation of the clutch hub by coupling the hub sleeve and the gear piece when the hub sleeve is moved from the first position to the second position in the axial direction,
   the synchronizer ring comprising:
      a ring body having an annular shape;
      an axial protruding portion, which protrudes from the ring body toward the clutch hub in the axial direction so as to set a size of an axial clearance to be formed between the ring body and the clutch hub in the axial direction; and
      a radial protruding portion, which protrudes from the ring body toward the clutch hub in a radial direction intersecting the axial direction so as to set a size of a radial clearance to be formed between the ring body and the clutch hub in the radial direction,
   the ring body, the axial protruding portion, and the radial protruding portion being formed integrally by metal stamping.

2. A synchronization device for a manual transmission of a vehicle according to claim 1,
   wherein the ring body of the synchronizer ring comprises:
      a cylindrical portion extending in a cylindrical shape along the axial direction; and
      a flange portion being connected to the cylindrical portion and extending along the radial direction,
   wherein the radial protruding portion protrudes from the cylindrical portion toward the clutch hub,
   wherein the axial protruding portion protrudes from the flange portion toward the clutch hub, and
   wherein all of the cylindrical portion, the flange portion, the radial protruding portion, and the axial protruding portion are equal to each other in thickness.

3. A synchronization device for a manual transmission of a vehicle according to claim 1,
   wherein the axial protruding portion of the synchronizer ring comprises a plurality of axial protruding portions formed at regular intervals in a circumferential direction of the ring body, and
   wherein the radial protruding portion of the synchronizer ring comprises a plurality of radial protruding portions formed at regular intervals in the circumferential direction of the ring body.

4. A synchronization device for a manual transmission of a vehicle according to claim 2,
   wherein the axial protruding portion of the synchronizer ring comprises a plurality of axial protruding portions formed at regular intervals in a circumferential direction of the ring body, and
   wherein the radial protruding portion of the synchronizer ring comprises a plurality of radial protruding portions formed at regular intervals in the circumferential direction of the ring body.

* * * * *